US010289665B2

(12) United States Patent
Cohen-Zur et al.

(10) Patent No.: US 10,289,665 B2
(45) Date of Patent: May 14, 2019

(54) CREATING AND CONSUMING MULTI-DIMENSIONAL REPRESENTATIONS

(71) Applicant: SAP Portals Israel Ltd., Ra'anana (IL)

(72) Inventors: Nirit Cohen-Zur, Ra'anana (IL); Itai Fonio, Tel Aviv (IL)

(73) Assignee: SAP Portals Israel Ltd., Ra'anana (IL)

( * ) Notice: Subject to any disclaimer, the term of this patent is extended or adjusted under 35 U.S.C. 154(b) by 199 days.

(21) Appl. No.: 15/335,922

(22) Filed: Oct. 27, 2016

(65) Prior Publication Data

US 2018/0121403 A1    May 3, 2018

(51) Int. Cl.
| | | |
|---|---|---|
| *G06F 17/24* | (2006.01) | |
| *G06F 17/22* | (2006.01) | |
| *G06F 16/28* | (2019.01) | |
| *G06F 16/955* | (2019.01) | |
| *G06Q 10/10* | (2012.01) | |

(52) U.S. Cl.
CPC ............ *G06F 17/24* (2013.01); *G06F 16/283* (2019.01); *G06F 16/9566* (2019.01); *G06F 17/2229* (2013.01); *G06F 17/2235* (2013.01); *G06Q 10/107* (2013.01)

(58) Field of Classification Search
CPC ...................................................... G06F 17/24
See application file for complete search history.

(56) References Cited

U.S. PATENT DOCUMENTS

| | | | |
|---|---|---|---|
| 6,990,793 B2 * | 1/2006 | Osborne et al. | ........ G06F 17/50 |
| 8,862,159 B2 | 10/2014 | Cohen-Zur | |
| 2003/0115188 A1 * | 6/2003 | Srinivasa | .......... G06F 17/30699 |
| 2004/0139061 A1 * | 7/2004 | Colossi et al. | ............ G06F 7/00 |
| 2015/0089389 A1 | 3/2015 | Cohen-Zur et al. | |

* cited by examiner

*Primary Examiner* — James J Debrow
(74) *Attorney, Agent, or Firm* — Fish & Richardson P.C.

(57) ABSTRACT

The disclosure generally describes methods, software, and systems, including a method for creating a multi-dimensional representation (MDR). A creation request is received to create an MDR referencing at least one identified data segment in each of at least a first source document. An MDR object is generated that includes data segment information for the at least one identified data segment and a set of resource metadata comprising, for each data segment, an identification of a source document that includes the particular identified data segment, a resource type of the source document, and a set of coordinates associated with the particular identified data segment within the source document. The MDR object is stored to a clipboard containing MDR objects. An insertion request is received to insert the stored MDR object into a target document. The stored MDR object is inserted from the clipboard into a target document.

20 Claims, 3 Drawing Sheets

CREATING AND CONSUMING MULTI-DIMENSIONAL REPRESENTATIONS

BACKGROUND

The present disclosure relates to presentation of information.

Users review different sections or parts of documents for various reasons, e.g., to perform an analysis, make a decision, review a document, or complete a specific task. For example, various sections or parts of drawings, textual documents, web pages, videos, and other documents may be of more interest to a user than other sections or parts of the documents. Users often share documents with other users, such as by attaching documents to email messages, sending links to documents on the Internet, and in other ways.

SUMMARY

The disclosure generally describes computer-implemented methods, software, and systems for creating and consuming multi-dimensional representations (MDRs). One computer-implemented method includes: receiving a creation request to create an MDR, the MDR referencing at least one identified data segment in each of at least a first source document; generating an MDR object, the MDR object including data segment information for the at least one identified data segment and a set of resource metadata, the set of resource metadata comprising, for each of the at least one identified data segment, an identification of a source document that includes the particular identified data segment, a resource type of the source document, and a set of coordinates associated with the particular identified data segment within the source document; storing the MDR object to a clipboard containing MDR objects; receiving an insertion request to insert the stored MDR object into a target document; and inserting the stored MDR object from the clipboard into a target document.

The foregoing and other implementations can each optionally include one or more of the following features, alone or in combination. In particular, one implementation can include all the following features:

In a first aspect, combinable with any of the previous aspects, the MDR describes how information from individual data segments of the at least one identified source document is combined to produce, for presentation to one or more users, a multi-dimensional data segment.

In a second aspect, combinable with any of the previous aspects, the method further comprises: receiving a consumption request to consume the inserted MDR object; accessing the set of resource metadata associated with the inserted MDR object; determining a type for each of the data segments included in the MDR object; launching, for each of the data segments of the MDR object, an application associated with the determined type for each data segment; and focusing the launched application, for each data segment, at a location based on the set of coordinates associated with the particular data segment.

In a third aspect, combinable with any of the previous aspects, one or more of receiving the creation request, generating the MDR object, storing the MDR object, receiving an insertion request, inserting the stored MDR object, receiving the consumption request, accessing the set of resource metadata, determining the type, launching the application, and focusing the launched application is done using an MDR plug-in.

In a fourth aspect, combinable with any of the previous aspects, the identification of the source document is one of a file name of a file, a URL or a network location of a web page or a resource, a title of an electronic document, or a database name of a database.

In a fifth aspect, combinable with any of the previous aspects, the method further comprises receiving a selection of multiple data segments in the first source document.

In a sixth aspect, combinable with any of the previous aspects, the method further comprises receiving a selection of a first data segment from a first source document and a selection of a second data segment from a second source document.

In a seventh aspect, combinable with any of the previous aspects, inserting the stored MDR object includes inserting a visual representation of each data segment into the target document, the visual representation of each data segment associated with the MDR object and capable of being activated to request consumption of the MDR object.

In an eighth aspect, combinable with any of the previous aspects, inserting the stored MDR object includes inserting a textual link associated with the MDR object, the textual link capable of being activated to request consumption of the MDR object.

In a ninth aspect, combinable with any of the previous aspects, inserting the stored MDR object includes embedding each of the at least one data segments within dedicated containers corresponding to the resource types of each data segment.

In a tenth aspect, combinable with any of the previous aspects, each of the dedicated containers are focused to at least a portion of the set of coordinates corresponding to the data segment associated with the dedicated container.

In an eleventh aspect, combinable with any of the previous aspects, the inserted MDR object comprises one of: a snapshot of the data segments and a separate metadata file storing the set of resource metadata; a snapshot of the data segments, wherein the set of resource metadata is embedded within the snapshot; and a unique link to the MDR object, wherein activation of the unique link is configured to access the data segments of the MDR object.

In a twelfth aspect, combinable with any of the previous aspects, receiving the creation request to create the MDR can include receiving MDR rules including: a set of MDR update rules limiting the types of updates that can be made over time to the MDR, the set of MDR update rules including data segment level rules associated with specific segments of the MDR, the data segment level rules controlling an ability, by multiple users, to update particular data segments included in the MDR; and a set of MDR presentation rules specifying how the MDR is to be presented, including highlighting rules specifying particular data segments to be highlighted for particular users; and the method further comprises inserting the MDR rules into the into a target document and updating the MDR based on the set of MDR update rules and the set of MDR presentation rules.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
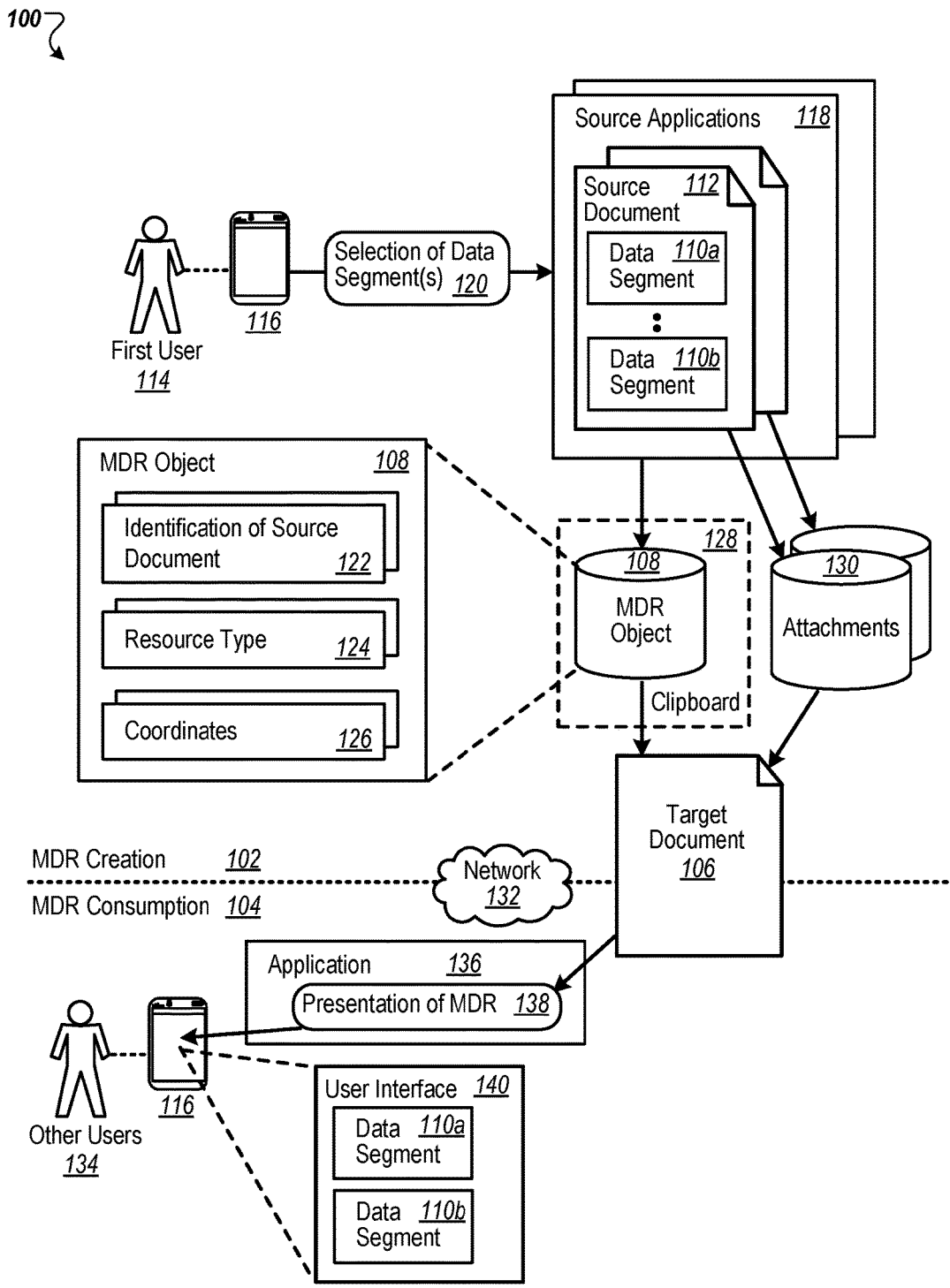
FIG. 1 is a block diagram of an example environment for creating and consuming MDRs.

This disclosure generally describes computer-implemented methods, software, and systems for creating and consuming a multi-dimensional representation (MDR). An MDR describes how information from at least one data segment from at least one source document (e.g., one or more files or other sources) is combined to produce, for presentation to one or more users, a multi-dimensional data segment. As a physical entity, and MDR object can be an electronic file, a set of instructions, or some other information that includes data elements representing and used to present the MDR to one or more users. For example, an MDR can include one or more specific paragraphs from a document, one or more specific sections of a web page, a set of views of images or drawings, an excerpt from a video or audio file, sections or areas of graphs or maps, sections of three-dimensional (3D) elements (e.g., buildings or models), or some other set of one or more segments (e.g., portions) of one or more source documents.

An MDR can refer to a segment in a document, several segments in a single document, or a segment that crosses or spans documents. An MDR can refer to different information types, such as document segments, video clips, power-point page ranges, web articles, or other types of information. An MDR can link to a point of interest, such as a page, an anchor, an address, a file, a video, or a specific point in the video. An MDR can identify a start and end reference, such as in text, video, or audio files. An MDR can be three-dimensional, such as using shapes and/or other groups of x,y,z points, or when referencing a collection of two-dimensional elements, such as in the same document or across multiple documents. An MDR can include segments in maps, such as from a closed geometric area selected to denote a property, or segments of trails that represent a route. An MDR can include segments in architectural plans or image files. An MDR can be constructed from a combination of different types of information, such as segments of maps, related (or unrelated) segments of text, and/or segments of video. An MDR can include other MDRs, such as when the smallest or fundamental MDR is of a single item. An MDR can include sections of graphs, maps, and 3D elements, such as building models, parts of 3D printing computer-aided design (CAD) models, pathological indications in medical scanning tools, and so on. MDRs can include a time dimension, including MDRs that include graphs over time, such as MDRs that track stock shares, medical results, or other items). MDRs can include video and/or audio over time intervals. In some implementations, MDRs can be implemented using, for example, MDR plug-ins. For example, different instances of MDR plug-ins can be provided for browser applications, multi-media (video/sound) player applications, map applications, text processing applications, spreadsheet applications, mail applications, and other applications. MDR plug-ins provided for different applications can have similar features and can work in similar ways, so that users who create and/or consume MDRs in one application can easily do so in other applications.

The subject matter described in this specification can be implemented in particular implementations so as to realize one or more of the following advantages. MDRs can provide a direct, simple, and easy way to access original data source and a user-selected relevance or context. Collections of data segments can be identified from one or more sources and grouped under a unifying topic, an aggregation, or a file. Multi-dimensional references can be made to various types of data segments, including text, pages, images, graphs, videos, maps, 3D elements, and sound. Further, each of the various types of data segments can include time dimensions. Users can be directed to relevant and focused data segments. Segments of data from different source types can be aggregated. Data segments can be collected under a unifying aggregator/file that can be provided to relevant consumers. Data segments can be provided directly in their original context. By capturing a context and/or identifying specific data segments, MDRs can save time and avoid user error, conflicts, confusion, and unnecessary searches in source documents. Consumers of MDRs can be referred to specific and relevant segments of data from multiple data sources, including one or more segments per data source. MDRs can refer to specific areas, volumes, and times. Rules can be defined and used that control the ability to update data segments represented by MDRs, e.g., to provide a tool for collaboration by multiple users. For example, the rules can allow one or more data segments of source data to be updated by multiple users over time, e.g., users linking to a shared graph presenting values for a specific time period. Users can add a presentation rule to a selected data segment, identifying shared trends or values, and linking to the data segment can highlight the relevant data, e.g., by applying an associated rule within that data segment.

FIG. 1 is a block diagram of an example environment 100 for creating and consuming MDRs. The environment 100 includes elements for MDR creation 102 and MDR consumption 104 that share in the use of a target document 106 that is created to include an MDR object 108. The target document 106 can be, for example, an email message that includes the MDR object 108 that is created by a first user 114. The MDR object 108 can include, for example, information that describes how information from individual data segments 110a, 110b of at least one identified source document 112 are combined to produce, for presentation to one or more users, a multi-dimensional data segment. For example, rather than a user having to review one or more source document(s) 112 for specific information (e.g., in specific data segments), the MDR object 108 encapsulates the information as the multi-dimensional data segment during MDR creation 102. As a result, an MDR-consuming user (e.g., one of other users 115) who receives the MDR object 108, e.g., though an email message, can be presented, during MDR consumption 104, with the specific information (e.g., data segments 110a, 110b) without having to sift through and locate positions within the source document(s) 112.

Creation of the MDR object 108 can be initiated, for example, when the first user 114, using a computing device 116 that is running a source application 118 (e.g., an email application), makes a selection 120 of at least one of one or more data segments 110a, 110b. The data segments 110a, 110b can be in the same or different source documents 112, such as two different snippets (e.g., paragraphs) from the same web page displayed in a browser. Selection of the one or more data segments 110a, 110b can be facilitated, for example, using MDR plug-ins in each of various source applications 118. For example, an MDR plug-in can be included within a browser application that the first user 114 uses to view the web page. A separate MDR plug-in, used by the email application, can be used to insert the created MDR object 108 into the email message. In some instances, MDR-related functionality may be built into the various applications illustrated in FIG. 1, while in others, add-ons and/or plug-ins can be used to provide MDR-related functionality. In some implementations, the MDR object 108 can include an identification 122 of the source document(s) 112, a resource type 124 of each source document 112, and coordinates 126 that specify one or more positions in the source document 112 that correspond to the data segment(s) that are included in the MDR object 108. Other elements of the MDR object 108 are possible. Identification 122 of the source document, for example, can include a file name of a file, a universal resource locator (URL) or a network location of a web page or a resource, a title of an electronic document, or a database name of a database, to name a few examples. The resource type 124 can be, for example, a file (e.g., of a certain type, such as text, spreadsheet, etc.), a web page or other electronic document, a database (including information that identifies the type of database, such as a "Vender O" database), or some other resource type. The coordinates 126 can include and/or identify, for example, starting (and optionally, ending) line numbers, paragraph numbers, page numbers, chapter numbers, pixel coordinates on an image, a start time (and optionally, a duration or length of time) in a audio/video resource, a person's name (e.g., patient, employee, etc.), a group/organization name, a subset of a set, a room name (e.g., "master bathroom" in architectural drawings), or some other indication that identifies a segment of a resource. The coordinates 126 can also include one or more of x,y coordinates, coordinates in at least two dimensions, a time element (e.g., including a starting time position in a resource and a duration time), a starting position and an ending position of a web page, and one or more paragraph or page numbers.

In some implementations, when an MDR object 108 is created, the MDR object 108 can be stored to a clipboard 128. The clipboard 128 can be maintained, for example, by an MDR plug-in that assembles the components 122-126 of the MDR object 108 based on the selection 120 of data segments made by the first user 114. The selection 120 can be made, for example, using a standard operating system (OS) based keyboard and/or in other ways. At any given time, the clipboard 128 can contain any number of MDR objects 108, such as none (if no MDR objects have yet been stored to the clipboard 128) or one or more MDR objects 108. In some implementations, the most recently created MDR object 108 can be highlighted and/or readied for pasting to the target document 106, such as when the first user 114 is adding the MDR object 108 to the target document 106 (e.g., an email message). The target document 106 can also include other elements, such as attachments 130, which may or may not be the source document(s) 112 from which data segments 110a, 110b were identified. Once the target document 106 is created during MDR creation 102, the target document 106 can be consumed (e.g., over network 132) by other users 134 within MDR consumption 104. In some implementations, consumption of the MDR can be initiated upon double-clicking on the MDR object (e.g., a "file.mdr" attachment) in the received email message. In some implementations, consumption of the MDR can be initiated automatically by whatever application 136 performs a presentation 138 of the MDR. In some implementations, after an MDR object 108 has been created, the MDR object 108 can be saved as a file (e.g., as opposed to being saved to the clipboard 128) or in some other way. At a later time, instead of attaching, from the clipboard 128, the MDR object 108 to the target document 106, the file containing the MDR object 108 can be attached to (or included with) target document 106. In some implementations, the user 114 can have the option, such as with a pull-down menu provided by an MDR plug-in, to select the destination of a created MDR object 108, such as to the clipboard, as a file, or in some other way.

The inserted MDR object 108 can be in different forms, and the selection of the form can depend on the resource type 124 of the particular source document 112. In some implementations, the inserted MDR object 108 can be a snapshot of the data segments 110a, 110b and a separate metadata file storing the set of resource metadata, including the elements 122, 124 and 126. In some implementations, the inserted MDR object 108 can be a snapshot of the data segments 110a, 110b, and the set of resource metadata can be embedded within the snapshot. In some implementations, the inserted MDR object 108 can be a unique link to data segments 110a 110b of the MDR object 108, and the unique link is configured to access, during activation of the link, the data segments of the MDR object.

In some implementations, MDR objects 108 can be stored and/or managed in other ways in addition to being inserted into target documents 106 (e.g., as part of an email message). For example, MDR objects 108 can be stored locally or stored in an MDR object repository, such as being made available over the network 132 (e.g., including the Internet and other networks). In some implementations, MDR objects can be used as templates for subsequent generation of MDR objects 108, e.g., by using some or all of the coordinates 126 in other source documents 112 that have a same resource type 124.

In some implementations, MDRs can be associated with resources that are accessible to both a creator and a consumer, as described above. In some implementations, an offline scenario can exist, such as the use of a closed network or for encryption purposes, in which the MDR object will also contain the original resource (e.g., instead of a reference or link) as well as the other MDR-related information (e.g., metadata). Size implementations of sending original resources plus metadata are almost the same as sending the original resource (e.g. video clip) since the metadata's size is small.

Figure 2:
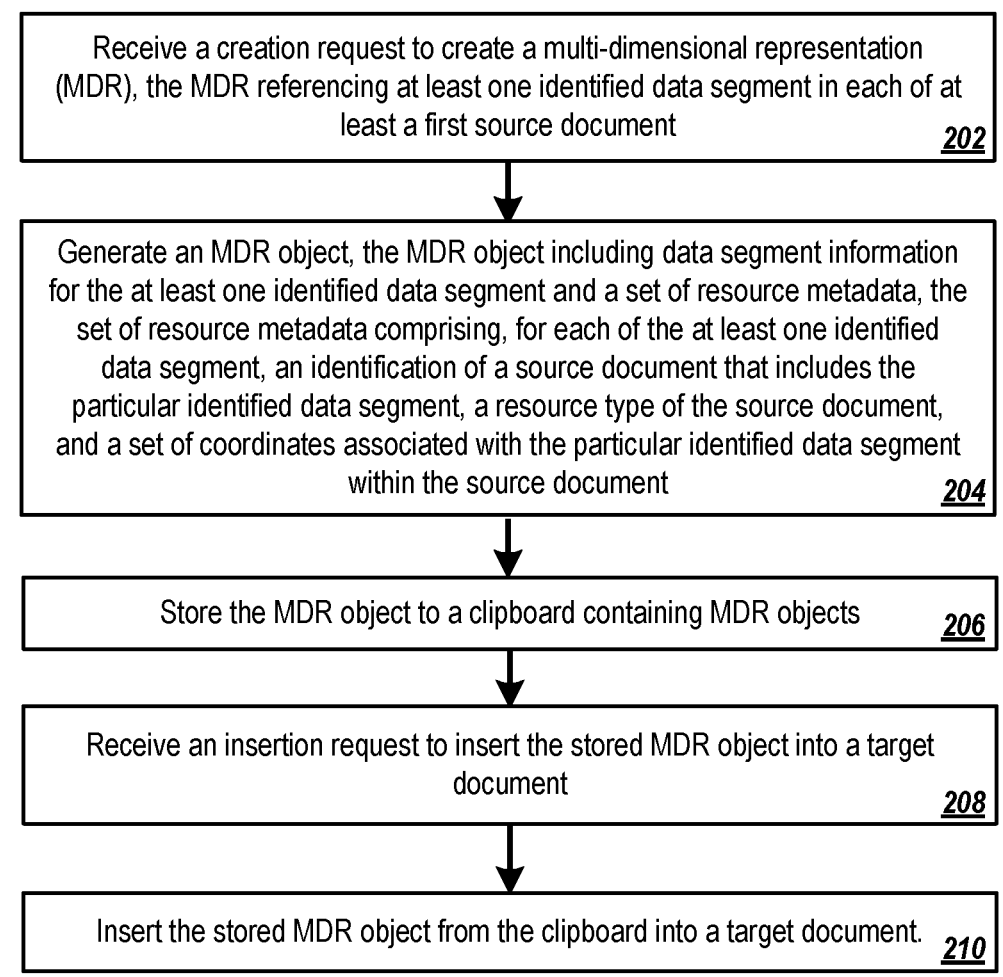
FIG. 2 is a flowchart of an example method for creating an MDR.

FIG. 2 is a flowchart of an example method 200 for creating an MDR. For clarity of presentation, the description that follows generally describes method 200 in the context of FIG. 1. In some implementations, operations the method 200 can be carried out using a collection of one or more MDR plug-ins (or some other application code) included in various applications that provide access to source documents 112 and/or target documents 106. Other implementations are possible.

At 202, a creation request is received to create a multi-dimensional representation (MDR), the MDR referencing at least one identified data segment in each of at least a first source document. For example, a user (e.g., the first user 114) using an email application can initiate actions to identify and select (120) the MDR object 108 that is to be added to an email message currently being drafted by the user. The user can decide, for example, to create an MDR that includes a selected region, such as one or more snippets from a web page (e.g., www.example.com/path). Using an MDR plug-in of a browser, for example, the user can select the particular snippet(s) from the web page while the web page is being displayed in the browser. Selection of the snippet(s) can be made, for example, using one or more of a right-click feature or menu options, or using some other controls or features of the browser. The user can further select additional data segments 110a, 110b (e.g., additional web page snippets) from the first source documents 112 (e.g., the same web page) and/or from other source documents 112 (e.g., other web pages). Selection can also occur using MDR plug-ins of other applications, such as applications used for text documents, drawing/design documents, spreadsheets, graphics-related documents, images, video, and any other documents that can be presented on, or referenced from, a computer. Selection (120) of subsequent data segments may or may not require repetition of the following operations of the method 200.

In some implementations, selection of multiple data segments in the first source document 112 can be received, as can the selection of multiple data segments in other source documents 112. Further, a selection of a first data segment 110a from a first source document 112 can be received, and a selection of a second data segment 110b from a second source document 112 can be received.

At 204, an MDR object is generated that includes data segment information for the at least one identified data segment and a set of resource metadata. The set of resource metadata includes, for each of the at least one identified data segment, an identification of a source document that includes the particular identified data segment, a resource type of the source document, and a set of coordinates associated with the particular identified data segment within the source document. For example, the MDR object 108 can include the identification 122 of the source document(s) 112 (e.g., the URL of the web page, such as www.example.com/path), the resource type 124 of each source document 112 (e.g., identifying the resource as a web page versus some other type of document), and coordinates 126 that specify one or more positions in the source document 112 that correspond to the data segment(s) that are included in the MDR object 108. In another example, an MDR object 108 can include multiple layers (or views) of architectural or other drawings, such as layers associated with heating, electrical and plumbing systems for a particular room of a house and or other segments from architectural drawings for all rooms of the house. Creating the MDR object 108 in this example can automatically pull the layers together, e.g., enabling a builder (or other recipient of the email containing the MDR object 108) to consume the drawings faster and easier than receiving the full drawings themselves. For example, without the use of an MDR, the entire set of drawings may need to be sent with a note that says "please review the heating, electrical and plumbing systems for the master bathroom." In some implementations, user preferences can be established and used that indicate (or per-source document rules can dictate) that MDRs are to include the original source document 112 as a whole.

In some implementations, the MDR object can include a timestamp. For example, a date and time that the MDR object 108 was created can be stored in the MDR object 108, or a date-time can be incorporated into the name of the MDR object 108 or stored elsewhere. In some implementations, the timestamp can be used to determine an expiration of an MDR object 108, such as if the source documents referenced by the MDR have a change date after the timestamp of the MDR object.

At 206, the MDR object is stored to a clipboard that contains MDR objects. As an example, upon selection of the snippet(s) from the web page, the MDR plug-in can store the selected snippet(s) to the clipboard 128 that is maintained, e.g., by an operating system in which the browser application is running. In some implementations, use of the clipboard 128 can be omitted, such as when selected data segments 110a, 110b are inserted directly into the target document 106, such as directly into the email message.

At 208, an insertion request is received to insert the stored MDR object into a target document. For example, using the email application, the user (e.g., the first user 114) can select a location within the email message being drafted, such as somewhere within the body of the email message or an attachment to the email attachment. The selection of the location can be made, for example, using features of the MDR plug-in of the email application, such as by right-clicking at an insertion point in order to paste full or partial contents of an MDR clipboard into the insertion point, e.g., indicating that the MDR object is to be embedded in the email message. In some implementations, the insertion request can be accompanied by a user-selectable option that indicates whether the insertion is to be done inline, as an attachment, or in some other way. User-selectable options can also indicate whether the source documents (e.g., text documents or other physical files) are to be attached as attachments or are to be linked. A link, for example, can serve as an address by which the source document can be accessed by the recipient of the email message or by an MDR plug-in at the time that the MDR is to be prepared for presentation, such as in real-time. In some implementations, the user can elect to insert more than one MDR object 108 from the clipboard 128, such as if the user has created multiple MDR objects 108 from multiple data segments 110a, 110b of multiple source documents 112. For example, the MDR plug-in can have features by which multiple MDR objects can be selected for insertion all at once.

In some implementations, insertion of the stored MDR object can occur in different insertion techniques, such as using one or more of a snapshot, linking, or embedding. The insertion technique that is used at any given time can depend, for example, on the resource type 124 and a type of application required to consume the MDR. The technique that is selected can be based, for example, on how likely other users 134 are to have access to applications needed to access and/or render the MDR. In some implementations, an original resource can be embedded in the MDR object, and segments associated with the MDR can be referenced by links.

When using the snapshot insertion technique, for example, inserting the stored MDR object 108 can include inserting, into the target document 106, a visual representation of each of the data segments 110a, 110b associated with the MDR object 108. The visual representation can be activated when consumption of the MDR object 108 is requested. In some implementations, visual representations used for the snapshot insertion technique can be in a common format that is easily rendered by applications that are likely to be available to the other users 134.

When using the linking insertion technique, for example, inserting the stored MDR object 108 can include inserting a textual link associated with the MDR object 108. The textual link can be capable of being activated to request consumption of the MDR object 108. For example, the textual link can be the URL of the web page from which the snippets were selected (120) by the first user 114. Subsequent consumption of the MDR object 108 in this example may present the entire web page but with the snippets being highlighted or otherwise identified in some way. In some implementations, a link can be used to link to an image, such as to a portion of the image in a segment source. In some implementations, when presenting an MDR that represents a portion of an image, the entire image can be presented, and the presentation can include presenting the entire image but highlighting of the portion, or just the portion can be presented.

When using the embedding insertion technique, for example, inserting the stored MDR object 108 can include embedding each of the at least one data segments 110a, 110b within dedicated containers corresponding to the resource types of each data segment. For example, attachments 130 that are also included in the target document 106 can include the actual data segments 110a, 110b.

In some implementations, each of the dedicated containers can be focused to at least a portion of the set of coordinates corresponding to the data segment associated with the dedicated container, e.g., with a first attachment 130 directed to a first snippet and a second attachment 130 directed to a second snippet. In some implementations, each dedicated container can include a link (e.g., a URL) to the source document that includes the corresponding identified data segment.

At 210, the stored MDR object is inserted, from the clipboard, into a target document. For example, the MDR plug-in can insert the MDR object 108 representing the user-selected snippets into the email message. In some implementations, the inserted MDR object can be represented by an icon (e.g., an MDR graphical icon), a file extension (e.g., ".mdr") on an attached file, and/or some other visual indicator that differentiates the MDR object from other attachments that may exist in the email message.

In some implementations, an MDR preview option can be provided by the MDR plug-in of the email application by which the user who is creating the email message can view the MDR as the MDR would be presented to a recipient of the email message. In some implementations, the MDR preview option can include MDR editing capabilities, such as to clip or further edit the snippets, to allow the user to specify different snippets, or to allow the MDR object to be changed in some other way.

In some implementations, when selecting specific data segments to be included in an MDR, the user can be presented with options (or user preferences/settings can be used) by which rights are granted to a recipient of the MDR object to view the entire source document. For example, a recipient may be allowed to view an entire web page upon receipt of the snippets that make up the MDR. However, MDRs from other types of documents (e.g., patient records, financial information, etc.) may be provided for which access rights are specified such that a recipient of the MDR object is not allowed to access information beyond the original specifications of the MDR (e.g., the set of coordinates associated with the particular identified data segment within the source document). Access rights for architectural drawings may be specified, for example, to allow the recipient to view other rooms represented by the drawings, except for portions that may be kept private (e.g., security system systems and/or controls). In some implementations, access rights provided with an MDR object can allow the recipient to edit the source documents in some way.

In some implementations, the method 200 can further include operations for consuming the MDR, such as during MDR consumption 104. For example, once the target document 106 is created, a consumption request can be received to consume the inserted MDR object. The request can be initiated, for example, by a user (e.g., one of the other users 134) using the application 136, such as an email application, for reading the received email. The request can be handled, for example, by the MDR plug-in of the application 136. The set of resource metadata associated with the inserted MDR object can be accessed, for example, when the MDR plug-in reads, from the MDR object 108 in the target document 106, one or more sets of the identification 122 of the source document 112, the resource type 124, and the coordinates 126. A type can be determined for each of the data segments 110a, 110b included in the MDR object 108. For each of the data segments 110a, 110b of the MDR object 108, an application can be launched that is associated with the determined type for each data segment. For example, if data segments 110a, 110b are portions (e.g., snippets) of a web page, then applications (e.g., including a browser) capable of rendering the portions can be launched by the application 136. For each data segment, the launched application can be directed to focus at a location based on the set of coordinates associated with the particular data segment. For example, the launched browser can direct the user to the specific portion(s) of the web page that were selected 120 by the first user 114. For example, within a user interface 140 presented to the other users 134, only data segments 110a, 110b from the source document 112 are presented. Focusing to a location can include, for example, the use of a visual or other indication of a referred data segment, such as by using highlighted text for a document or by highlighting (e.g., within a video player) particular time segments of a video.

In some implementations, receiving the creation request to create the MDR can include receiving MDR rules. For example, the MDR rules can include a set of MDR update rules that limit the types of updates that can be made over time to the MDR. The MDR rules can also include data segment level rules associated with specific segments of the MDR. For example, the data segment level rules can control an ability, by multiple users, to update particular data segments included in the MDR. The MDR rules can also include a set of MDR presentation rules that specify how the MDR is to be presented. For example, the MDR presentation rules can include highlighting rules that specify particular data segments to be highlighted for particular users. The method 200 can further include operations for inserting the MDR rules into the into a target document and updating the MDR based on the set of MDR update rules and the set of MDR presentation rules. As an example, a rule can be linked to a market share graph presenting values over a time period. A presentation rule can be defined relative to a data segment associated with the graph that controls presentation of information, for example, when a positive trend over x % exists within the time period. Then, when the graph is presented that is based on values in the data segment, highlighting can be used to annotate the relevant data that complies with the presentation rule for that data segment. In this example, linked data and the use of the presentation rule are dynamic and based on a current value when the graph is presented.

Figure 3:
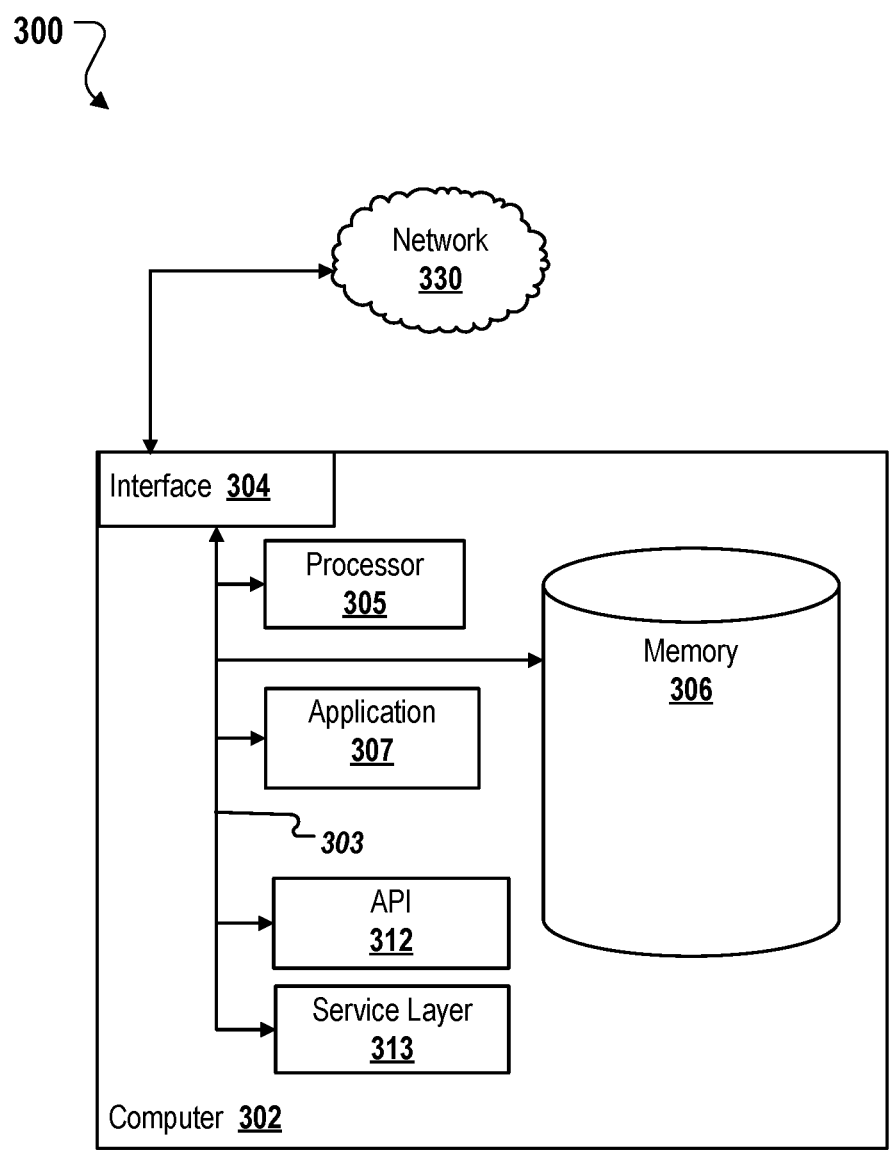
FIG. 3 is a block diagram of an exemplary computer system used to provide computational functionalities associated with described algorithms, methods, functions, processes, flows, and procedures as described in the instant disclosure.

FIG. 3 is a block diagram of an exemplary computer system 300 used to provide computational functionalities associated with described algorithms, methods, functions, processes, flows, and procedures as described in the instant disclosure.

The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a GUI.

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, business intelligence (BI) server, or other server (or a combination of servers).

The computer 302 can receive requests over network 330 from a client application (for example, executing on another computer 302) and responding to the received requests by processing the said requests in an appropriate software application. In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems in a distributed environment that are connected to the network 330 (whether illustrated or not). Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a memory 306 that holds data for the computer 302 or other components (or a combination of both) that can be connected to the network 330 (whether illustrated or not). For example, memory 306 can be a database storing data consistent with this disclosure. Although illustrated as a single memory 306 in FIG. 3, two or more memories may be used according to particular needs, desires, or particular implementations of the computer 302 and the described functionality. While memory 306 is illustrated as an integral component of the computer 302, in alternative implementations, memory 306 can be external to the computer 302.

The application 307 is an algorithmic software engine providing functionality according to particular needs, desires, or particular implementations of the computer 302, particularly with respect to functionality described in this disclosure. For example, application 307 can serve as one or more components, modules, applications, etc. Further, although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
   receiving, by at least one processor, a creation request to create a multi-dimensional representation (MDR) object in an MDR, the MDR object referencing at least one identified data segment in each of at least a first source document;
   generating, by the at least one processor, the MDR object, the MDR object including data segment information for the at least one identified data segment and a set of resource metadata, the set of resource metadata comprising, for each of the at least one identified data segment, an identification of a source document that includes the particular identified data segment, a resource type of the source document, and a set of coordinates associated with the particular identified data segment within the source document, wherein different source documents in the MDR object have resource types and different types of information, and wherein the MDR object, when consumed, launches, for each of the data segments of the MDR object, an application associated with a determined type for each data segment;
   storing, by the at least one processor, the MDR object to a clipboard containing MDR objects;
   receiving, by the at least one processor, an insertion request to insert the stored MDR object into a target document; and
   inserting, by the at least one processor, the stored MDR object from the clipboard into a target document.

2. The computer-implemented method of claim 1, wherein the MDR object describes how information from individual data segments of the at least one identified source document is combined to produce, for presentation to one or more users, a multi-dimensional data segment.

3. The computer-implemented method of claim 1, further comprising:
   receiving a consumption request to consume the inserted MDR object;
   accessing the set of resource metadata associated with the inserted MDR object;
   determining a type for each of the data segments included in the MDR object;
   launching, for each of the data segments of the MDR object, an application associated with the determined type for each data segment; and
   focusing the launched application, for each data segment, at a location based on the set of coordinates associated with the particular data segment.

4. The computer-implemented method of claim 3, wherein one or more of receiving the creation request, generating the MDR object, storing the MDR object, receiving an insertion request, inserting the stored MDR object, receiving the consumption request, accessing the set of resource metadata, determining the type, launching the application, and focusing the launched application is done using an MDR plug-in.

5. The computer-implemented method of claim 1, wherein the identification of the source document is one of a file name of a file, a URL or a network location of a web page or a resource, a title of an electronic document, or a database name of a database.

6. The computer-implemented method of claim 1, further comprising receiving a selection of multiple data segments in the first source document.

7. The computer-implemented method of claim 1, further comprising receiving a selection of a first data segment from a first source document and a selection of a second data segment from a second source document.

8. The computer-implemented method of claim 1, wherein inserting the stored MDR object includes inserting a visual representation of each data segment into the target document, the visual representation of each data segment associated with the MDR object and capable of being activated to request consumption of the MDR object.

9. The computer-implemented method of claim 1, wherein inserting the stored MDR object includes inserting a textual link associated with the MDR object, the textual link capable of being activated to request consumption of the MDR object.

10. The computer-implemented method of claim 1, wherein inserting the stored MDR object includes embedding each of the at least one data segments within dedicated containers corresponding to the resource types of each data segment.

11. The computer-implemented method of claim 10, wherein each of the dedicated containers are focused to at least a portion of the set of coordinates corresponding to the data segment associated with the dedicated container.

12. The computer-implemented method of claim 10, wherein each dedicated container includes a link to the source document that includes the corresponding identified data segment.

13. The computer-implemented method of claim 1, wherein the inserted MDR object comprises one of:
 a snapshot of the data segments and a separate metadata file storing the set of resource metadata;
 a snapshot of the data segments, wherein the set of resource metadata is embedded within the snapshot; and
 a unique link to the MDR object, wherein activation of the unique link is configured to access the data segments of the MDR object.

14. The computer-implemented method of claim 1, wherein the set of coordinate includes one or more of:
 one or more x,y coordinates;
 one or more coordinates in at least two dimensions;
 a time element, including a starting time position in a resource and a duration time;
 a starting position and an ending position of a file or web page; and
 one or more paragraph or page numbers.

15. The computer-implemented method of claim 1, wherein the MDR object is a file.

16. The computer-implemented method of claim 1, wherein receiving the creation request to create the MDR object includes receiving MDR rules including:

a set of MDR update rules limiting the types of updates that can be made over time to the MDR object, the set of MDR update rules including data segment level rules associated with specific segments of the MDR object, the data segment level rules controlling an ability, by multiple users, to update particular data segments included in the MDR object; and
a set of MDR presentation rules specifying how the MDR object is to be presented, including highlighting rules specifying particular data segments to be highlighted for particular users;
the method further comprising:
 inserting the MDR rules into the into a target document; and
 updating the MDR object based on the set of MDR update rules and the set of MDR presentation rules.

17. A system comprising:
memory storing information associated with MDR objects; and
a server performing operations comprising:
 receiving, by at least one processor, a creation request to create an MDR object in an MDR, the MDR object referencing at least one identified data segment in each of at least a first source document;
 generating, by the at least one processor, an MDR object, the MDR object including data segment information for the at least one identified data segment and a set of resource metadata, the set of resource metadata comprising, for each of the at least one identified data segment, an identification of a source document that includes the particular identified data segment, a resource type of the source document, and a set of coordinates associated with the particular identified data segment within the source document, wherein different source documents in the MDR object have resource types and different types of information, and wherein the MDR object, when consumed, launches, for each of the data segments of the MDR object, an application associated with a determined type for each data segment;
 storing, by the at least one processor, the MDR object to a clipboard containing MDR objects;
 receiving, by the at least one processor, an insertion request to insert the stored MDR object into a target document; and
 inserting, by the at least one processor, the stored MDR object from the clipboard into a target document.

18. The system of claim 17, wherein the MDR object describes how information from individual data segments of the at least one identified source document is combined to produce, for presentation to one or more users, a multi-dimensional data segment.

19. A non-transitory computer-readable media encoded with a computer program, the program comprising instructions that when executed by one or more computers cause the one or more computers to perform operations comprising:
 receiving, by at least one processor, a creation request to create an MDR object in an MDR, the MDR object referencing at least one identified data segment in each of at least a first source document;
 generating, by the at least one processor, the MDR object, the MDR object including data segment information for the at least one identified data segment and a set of resource metadata, the set of resource metadata comprising, for each of the at least one identified data segment, an identification of a source document that includes the particular identified data segment, a resource type of the source document, and a set of coordinates associated with the particular identified data segment within the source document, wherein different source documents in the MDR object have resource types and different types of information, and wherein the MDR object, when consumed, launches, for each of the data segments of the MDR object, an application associated with a determined type for each data segment;

storing the MDR object to a clipboard containing MDR objects;

receiving an insertion request to insert the stored MDR object into a target document; and inserting the stored MDR object from the clipboard into a target document.

20. The non-transitory computer-readable media of claim 19, wherein the MDR object describes how information from individual data segments of the at least one identified source document is combined to produce, for presentation to one or more users, a multi-dimensional data segment.

\* \* \* \* \*